May 26, 1925.

E. A. BIENENSTOK

WELDING MACHINE

Filed May 17, 1924

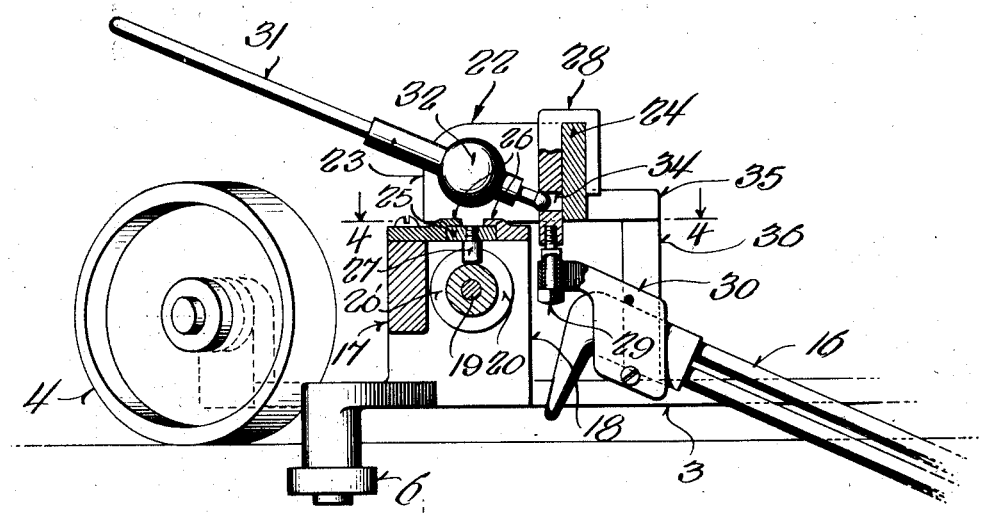

Patented May 26, 1925.

1,539,383

UNITED STATES PATENT OFFICE.

EDGAR A. BIENENSTOK, OF MILWAUKEE, WISCONSIN, ASSIGNOR TO MILWAUKEE TANK WORKS, OF MILWAUKEE, WISCONSIN.

WELDING MACHINE.

Application filed May 17, 1924. Serial No. 714,012.

*To all whom it may concern:*

Be it known that I, EDGAR A. BIENENSTOK, a citizen of the United States, and resident of Milwaukee, in the county of Milwaukee and State of Wisconsin, have invented certain new and useful Improvements in Welding Machines; and I do hereby declare that the following is a full, clear, and exact description thereof.

This invention relates to welding machines and more particularly to that type illustrated in my pending application for patent filed June 2, 1923, Serial No. 649,016, in which is disclosed an apparatus adapted to be mounted on the work and propelled thereon.

The primary object of the present invention is to provide an improved and simplified structure of the foregoing character, in which means is provided for reciprocating or moving the torch transversely of its path of travel over the seam to be welded, whereby the material at either side of the seam is caused to flow more freely, resulting in a firmer and more secure joining of the metals.

A further object resides in the provision of a device of this character, adapted to automatically weld the end seams of circular tanks, and which will accommodate itself to tanks of various diameters without adjustment.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Fig. 3 is an enlarged detail view taken on the line 3—3 of Fig. 1;

Fig. 4 is a fragmentary plan view with parts broken away and in section; and

Figure 5 is a diagrammatic view illustrating a portion of the tank in section, and the operation of the torch nozzle with relation thereto.

Figure 1:
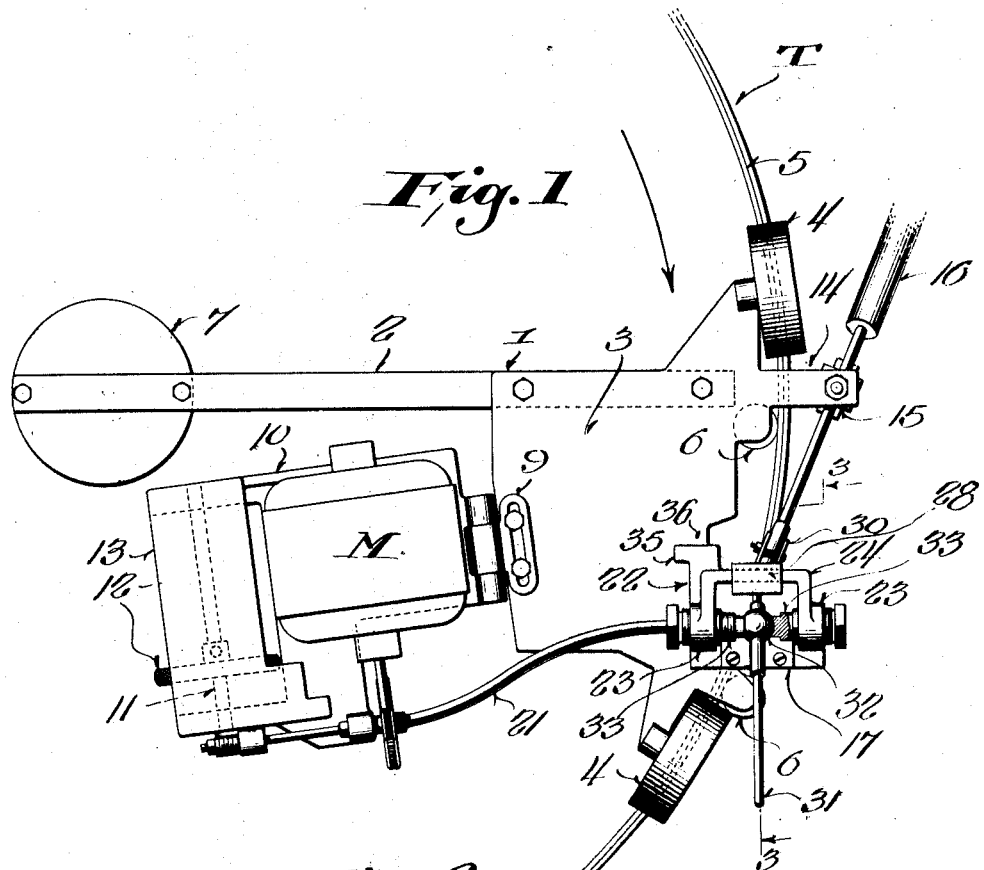
Figure 1 is a plan view of an apparatus constructed in accordance with the present invention, the same being shown in connection with a circular tank.

Referring now more particularly to the form of the invention illustrated in the accompanying drawings, the numeral 1 designates generally a torch carrying frame comprising an arm 2 secured in any suitable manner to the horizontal plate 3, which plate carries a pair of vertical supporting rollers 4 adapted to travel on the track 5 formed by the adjacent edges of the end and side of the tank T.

Cooperating with the rollers 4, for the purpose of rotatably mounting the frame 1 on the material to be welded, are a pair of horizontal guide rollers 6 which are disposed on the inner and outer sides of the track 5 and engage the same for the purpose of guiding the frame with relation to the track, the guide rollers 6 being rotatably carried by the plate 2. For the purpose of supporting the inner end of the frame structure on the tank, a socket plate 7 is bolted or otherwise secured to the inner end of the arm 2, and retains the ball 8, which engages the top of the tank, and permits free movement of the frame thereon.

Motor propelled means is employed for the purpose of propelling the frame on the tank and this is provided for by means of a bracket 9 bolted to the plate 3 and to which is pivotally secured a motor base 10 having mounted thereon a motor M of any conventional structure. The free end of the motor base 10 has journalled therein a propeller shaft 11 which is driven by suitable gearing connection with the motor, and has adjustably mounted thereon a frictional drive wheel 12, which is adjustable longitudinally on the shaft for the purpose of regulating the speed of travel of the frame, as will be hereinafter described.

Figure 2:
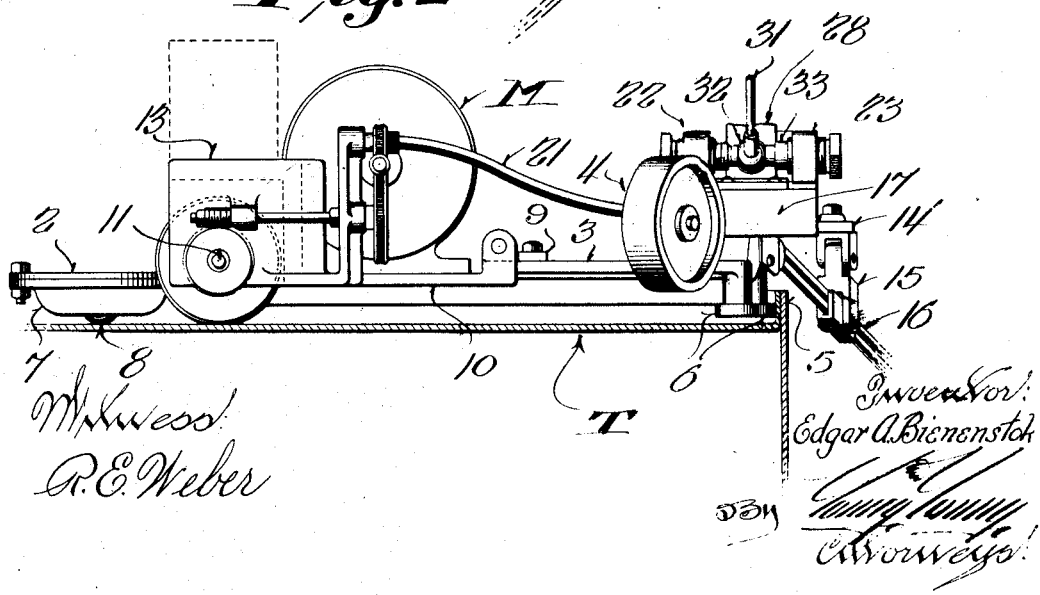
Fig. 2 is a side elevational view of the apparatus.

Directly over the propeller shaft the base 10 is provided with a raised platform 13 for the reception of a weight, which it is proposed to utilize for the purpose of insuring sufficient frictional engagement between the drive wheel 10 and the work, the weight being indicated in dotted lines in Figure 2.

Projecting outwardly from the plate 3 and extending beyond the side of the tank is an arm 14 from which is suspended a universal bracket 15 that carries a welding torch 16, which is of any conventional structure. The universal bracket 15 is designed to permit movement of the torch in all directions for the purposes to be described in the operation of the device.

For supporting the nozzle of the torch 16, the plate 3 is provided with an offset bracket 17 comprising the side members 18 in which is journaled a shaft 19 having mounted thereon a cam 20 provided with an annular cam slot 20'. The shaft 19 is rotated by means of the flexible shaft 21 which is driven through a gear connection with the motor.

Slidably mounted on the bracket 17 is an auxiliary frame 22 comprising the sides 23 connected by the transverse member 24 and the bar 25, the latter being slidably held on the bracket 17 by means of the guideways 26. Depending from the bar 25 is a stud 27 which projects into the annular cam slot 20'.

From the foregoing it will be seen that as the cam 20 is rotated, reciprocative movement will be imparted to the auxiliary frame 22. In order to permit manual manipulation of the torch nozzle, in addition to mechanical reciprocative movement, a U-shaped supporting bracket 28 straddles the transverse member 24 of the frame 22 and is adapted for horizontal or vertical movement thereon. Depending from the bracket 28 is a stud 29 on which is loosely and rotatably mounted a clip 30 which surrounds the nozzle head and supports the same above the work to be welded.

The bracket 28 is manipulated by means of a hand lever 31, universally carried by the auxiliary frame 22 by means of the ball 32 secured to the handle and journaled in the spherical socketed ends of the studs 33, which studs are threaded into the sides 23 of the auxiliary frame. The lower end of the lever 31 is provided with a spherically formed end projecting into the opening 34 provided in the U-shaped bracket 28. An offset ear 35, carried by the auxiliary frame 22 engages a stud 36 projecting upwardly from the plate 3, thus serving to support the outer end of the auxiliary frame and prevent its binding in the guideways 26.

In its operation, the present form of the invention, shown and described, is placed upon the top of a cylindrical tank in the manner illustrated in Figure 1, the guide rollers 6 engaging the inner and outer surfaces of the track 5 formed by the adjacent edges of the top and side, and by means of the manipulating lever 31, the nozzle of the torch is then properly positioned over the seam to be welded, it being understood that sufficient friction is exerted on the ball 32, by means of turning in the studs 33 to retain the nozzle in adjusted position with reference to the auxiliary frame 22. The current is then applied to the motor which propels the friction drive wheel 12 and rotates the cam 20. This causes the entire frame 1 to rotate upon the track 5 during which movement the auxiliary frame 22 is simultaneously reciprocated, causing the torch nozzle to move back and forth transversely of the seam.

Should it be desired to remove the torch from over the work or to direct it manually, the same may be readily accomplished by means of the hand lever 31 which is adapted to move the bracket 28, that carries the nozzle, in any direction either vertical or horizontal, on the frame 22.

Particular attention is directed to the method of propelling the frame 1 on the work, and in which the line of drive of the wheel 12, instead of being parallel to the track 5, is offset at an angle thereto thus causing the inner and outer guide rollers 6 to engage the opposite sides of the track 5 as the frame is rotated in a clockwise direction. The importance of this arrangement results from the fact that the device will operate on tanks of various diameters without the necessity of any adjustments, thus materially simplifying the structure required and the operation of the apparatus.

It is also obvious that upon shifting and adjusting the driving wheel 12 longitudinally on the shaft 11, its position with relation to the arc, upon which it must travel, will vary, thus varying the speed of travel of the frame as desired.

From the foregoing it is obvious that a very simple and economical structure has been provided which will permit the mechanical welding of seams without the necessity of an operator's entire attention, except to start and stop the apparatus, thus enabling him to perform several operations at a time.

I claim:

1. A seam welding machine comprising a frame adapted to be mounted on an article to be welded, a torch carried by said frame, means for laterally guiding the frame on the article, and means for propelling said frame and urging the guiding means into lateral engagement with said article.

2. A seam welding machine comprising a frame adapted to be mounted on an article to be welded, a torch carried by said frame, horizontal rollers carried by said frame for engagement with opposite sides of the work material, means for propelling said frame on the article and urging said guiding rollers into proper engagement with said article, and means for imparting movement to the torch transversely of the work seam.

3. A seam welding machine comprising a frame adapted to be mounted on an article to be welded, means for movably supporting said frame on the article, a pair of horizontal guide rollers carried by said frame and each, engaging the work upon opposite sides, means for propelling the frame on said article and urging said guide rollers to proper engagement with said article, and means for imparting movement to the torch transversely of the work seam simultaneously with movement of the frame on said article.

4. A seam welding machine for welding a seam at a projecting flange, said machine comprising a frame having supporting rollers and having a pair of spaced rollers adapted for positioning on the inner and outer sides of said flange, a torch carried by said frame, and a rotary friction wheel adapted to engage the work and to rock the last-mentioned rollers into engagement, respectively, with the outer and inner side of said flange and to propel the frame along the seam.

5. A seam welding machine for welding a seam at a projecting flange, said machine comprising a frame having supporting rollers and having a pair of spaced rollers adapted for positioning on the inner and outer sides of said flange, a torch carried by said frame, a rotary friction wheel adapted to engage the work and to rock the last-mentioned rollers into engagement, respectively, with the outer and inner side of said flange and to propel the frame along the seam, a motor for driving said friction wheel, said motor and said friction wheel being pivotally supported from said frame and adapted for independent rocking motion about a horizontal axis with reference to said frame.

6. A machine for welding a seam at a projecting flange, said machine comprising a main frame having supporting rollers adapted to travel upon said flange and having rollers adapted to engage the outer and inner side of said flange, an auxiliary frame pivotally joined to said main frame and adapted to rock with reference to said main frame about a horizontal axis, a friction wheel and a motor for driving said wheel carried by said auxiliary frame, said friction wheel being adapted to contact with the work and rock said last-mentioned rollers against the outer and inner sides of said flange, respectively, a torch carried by said main frame and adapted to operate upon said flange, means for reciprocating said torch transversely of said flange, and a flexible shaft operatively connecting said reciprocating means and said motor.

In testimony that I claim the foregoing I have hereunto set my hand at Milwaukee, in the county of Milwaukee and State of Wisconsin.

EDGAR A. BIENENSTOK.